Nov. 15, 1966 H. R. IRONS 3,286,099

LOGIC CIRCUITS EMPLOYING TORSIONALLY STRAINED MAGNETIC CORES

Filed Sept. 24, 1962 2 Sheets-Sheet 1

INVENTOR
HENRY R. IRONS

BY [signature]
ATTORNEY

FIG.4.
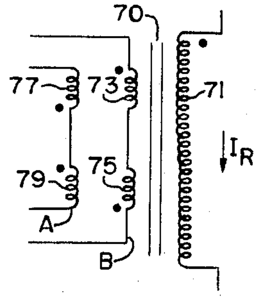
EXCLUSIVE OR GATE
FIG.4a.
| A | B | OUT |
|---|---|---|
| 0 | 0 | 0 |
| 0 | 1 | 1 |
| 1 | 0 | 1 |
| 1 | 1 | 0 |
FIG.5.
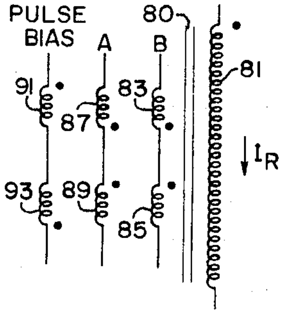
EQUIVALENCE GATE
FIG.5a.
| A | B | OUT |
|---|---|---|
| 0 | 0 | 1 |
| 1 | 0 | 0 |
| 0 | 1 | 0 |
| 1 | 1 | 1 |
FIG.6.
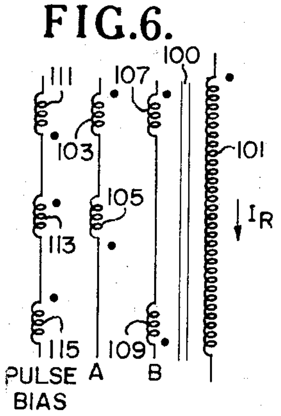
NOT AND GATE
FIG.6a.
| A | B | OUT |
|---|---|---|
| 0 | 0 | 1 |
| 0 | 1 | 1 |
| 1 | 0 | 1 |
| 1 | 1 | 0 |
FIG.7
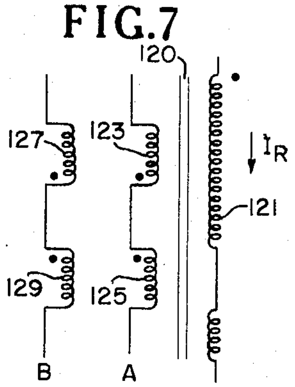
ALTERNATE FORM
OF AND GATE
FIG.7a.
| A | B | OUT |
|---|---|---|
| 0 | 0 | 0 |
| 1 | 0 | 0 |
| 0 | 1 | 0 |
| 1 | 1 | 1 |
INVENTOR
HENRY R. IRONS
BY [signature]
ATTORNEY United States Patent Office 3,286,099

Patented Nov. 15, 1966

3,286,099

LOGIC CIRCUITS EMPLOYING TORSIONALLY STRAINED MAGNETIC CORES

Henry R. Irons, Washington, D.C., assignor to the United States of America as represented by the Secretary of the Navy Filed Sept. 24, 1962, Ser. No. 225,944
5 Claims. (Cl. 307—88)

The invention described herein may be manufactured and used by or for the Government of the United States of America for governmental purposes without the payment of any royalties thereon on therefor.

This invention relates generally to logic circuits. More particularly this invention relates to logic circuits employing magnetic cores for data storage in which a torsional strain is applied thereto.

Several systems for performing logic functions with all magnetic devices have been used in the past. Most of these devices have employed closed magnetic circuits of ferrous material. The logic element employed in this invention may be made of material having a square hysteresis loop characteristic such as, for example, permalloy. The logic element of this invention makes use of the phenomenon described by K. J. Sixtus and L. Tonks, in Physical Review, vol. 42, p. 419, 1932, namely that mechanically strained wires of ferrous material such as nickel-iron exhibit a re-entrant hysteresis loop. Magnetization reversal in such wires can be nucleated by a strong field applied to a small portion of the wire or core and then propagated through a large region of the wire by a bias field having a value insufficient to cause the initial nucleation. In this invention magnetic logic circuits are disclosed in which the strong field is applied by a combination of a bias field and a signal from a previous core to a small portion of a core. A readout signal is applied to provide the bias field.

An object of this invention is to provide a core having improved magnetic characteristics.

It is another object of this invention to provide a core for magnetic circuits having a unique B–H loop.

It is a further object of this invention to employ a linearly disposed core in a magnetic circuit in which the core produces an unusual B–H loop as a result of a torsional strain applied to said core.

A still further object is to provide logic circuitry composed of all magnetic elements.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 4 illustrates an "Exclusive Or" gate logic circuit;

FIG. 4*a* is a table illustrating the modes of operation of the circuit of FIG. 4;

FIG. 5 illustrates an "Equivalence" gate logic circuit;

FIG. 5*a* is a table illustrating the modes of operation of the circuit of FIG. 5;

FIG. 6 illustrates a "Not And" gate logic circuit;

FIG. 6*a* is a table illustrating the modes of operation of the circuit of FIG. 6;

FIG. 7 illustrates an alternative form of an "And" gate logic circuit; and

FIG. 7*a* is a table illustrating the modes of operation of the circuit of FIG. 7.

Figure 1:
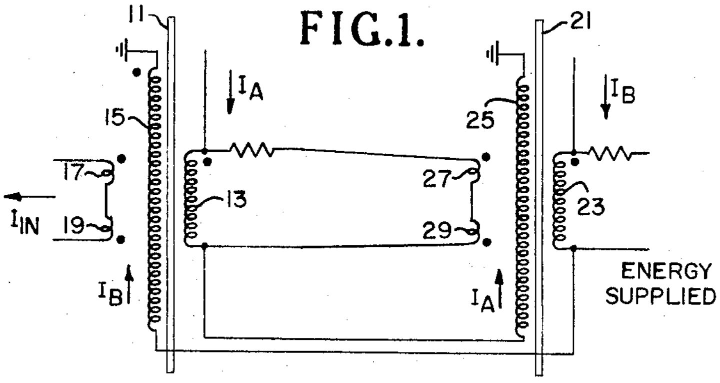
FIG. 1 illustrates a two stage logic circuit of this invention.

Referring now to FIG. 1 of the drawings, in which two stages of a logic circuit are shown, a first stage includes core 11, readout winding 13, reset or clock pulse winding 15 and input windings 17 and 19. A second stage includes a core 21, readout winding 23, reset or clock pulse winding 25 and input windings 27 and 29. The dots associated with the windings indicate the sense of the windings. Cores 11 and 21 are preferably permalloy wire cores to which torsional stresses are applied. The torsional stresses may be kept in the cores by fastening the ends of the cores after the desired torsional stress has been applied.

Figure 2:
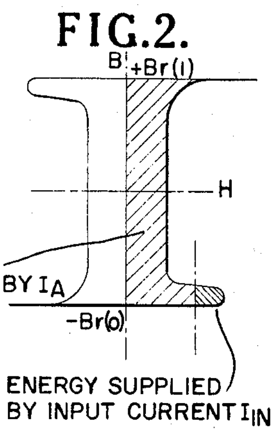
FIG. 2 illustrates the re-entrant B–H loop of the strained cores of this invention.

Referring to FIGS. 1 and 2 for the operation of the logic circuits of this invention, a current $I_A$ is applied to readout winding 13 of core 11 and to reset winding 25 of core 21 and a current $I_B$ is applied to readout winding 23 of core 21 and to reset winding 15 of core 11. Currents $I_A$ and $I_B$ are applied in alternate pulses to cores 11 and 21 respectively. Current $I_A$ is applied to the circuit which reads out core 21 to a $-Br(0)$ position and causes a bias field on core 11 which is less than required to cause this core to start switching. If, however, an input is present it will start switching core 11 and because of the shape of the B–H loop of FIG. 2, the current $I_A$ will be strong enough to complete the switching of core 11. This switching will occur in a portion of core 11 under winding 19 and will continue over the full length of winding 13. The input pulse $I_{IN}$ applied to winding 19 terminates after the section of the core under the winding is switched thus permitting the section of core 11 under winding 17 to be switched by current $I_A$. The current produced in windings 27 and 29 by $I_A$ will not affect core 21 since the field produced by $I_A$ in winding 25 is very strong. The section of core 11 under winding 13 will remain at $+Br(1)$ on the B–H loop of FIG. 2 after current $I_A$ is removed.

As soon as current $I_A$ is removed, current $I_B$ will be applied causing a transfer of information from core 11 to core 21.

The magnetic field produced by current $I_B$ flowing in winding 15 will switch core 11 from the position of $+Br(1)$ on the B–H loop to a position of $-Br(0)$ and it will also produce a current in winding 23 which in combination with the current in coil 29 will begin the triggering of core 21. The magnetic field created by the flow of current $I_B$ through winding 23 will complete the switching of core 21. One of the purposes of having windings 17 and 19 or 27 and 29 is to prevent an induced voltage from being applied back to the input, for example to winding 13 in the case of windings 27 and 29. Current thus prevented from flowing back to a previous stage assures the unilateral flow of information. The output of readout winding 23 may be applied to the input circuit of another stage. Any number of stages desired may be employed.

Figure 3:
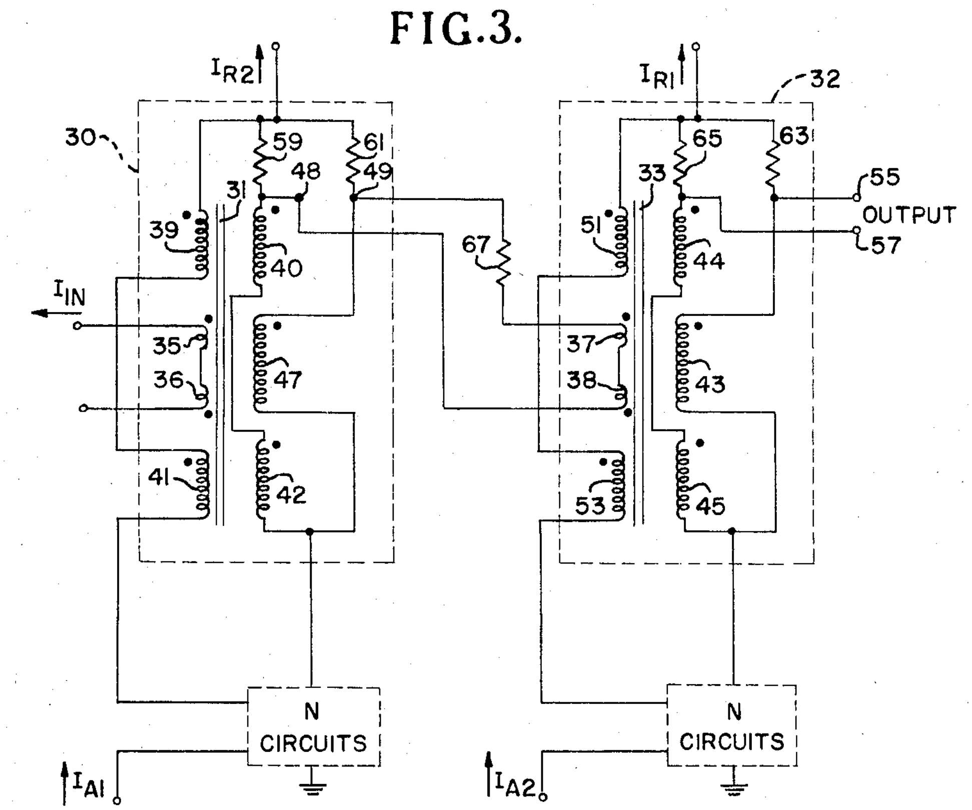
FIG. 3 illustrates a bridge type logic circuit of this invention.

Referring now to FIG. 3 of the drawings in which a bridge type arrangement of magnetic logic circuits 30 and 32 are shown, cores 31 and 33 are provided with input windings 35, 36, and 37, 38, respectively. A current $I_{A1}$ is applied to windings 39 and 41 at the time an input signal $I_{IN}$ is applied to input windings 35 and 36 of core 31 and at the same time $I_{R1}$ is applied to windings 43, 44 and 45 of core 33. The input signal $I_{IN}$, if present will trigger the portion of core 31 under winding 47. The flux caused by the current $I_A$, will complete the switching of core 31 in the portion of the core under winding 47. The portions of the core under windings 40 and 42 will not be switched due to the holding fields created in windings 39 and 41 by current $I_{A1}$. In the next phase of operation, currents $I_{A2}$ and $I_{R2}$ are applied. The current $I_{R2}$ flowing in winding 47 will reset core 31 to its original state if it has been switched when currents $I_{A1}$ and $I_{R1}$ were applied. The switching voltage across winding 47 will cause a current to flow in windings 37 and 38 causing an initiation of a switching action in core 33 under winding 43. The current $I_{A2}$ flowing in winding 43 will complete the switching of core 33 under winding 43. If the portion of core 31 under winding 47 had not been previously switched, the voltage between points 48 and 49 would be zero and no current would flow in windings 37 and 38 at the time that currents $I_{A2}$ and $I_{R2}$ were applied. The portion of core 33 under windings 44 and 45 will not be switched due to the holding fields created by current $I_{A2}$ flowing in windings 51 and 53.

A switching voltage developed across winding 43 will appear at output terminals 55 and 57 for application to a next stage of circuitry which may be similar to the previous stages described. Resistors 59, 61, 63, 65 and 67 provide the output voltage desired to be passed on from one stage to the next. Any number of circuits may be added to each of the circuits 30 and 32 as illustrated by "N circuits" in the drawing.

Referring now to FIGS. 4 and 4*a* of the drawings a logic circuit in the form of an "Exclusive Or" gate is provided in which an output voltage may or may not occur across winding 71 depending upon whether or not input signals are applied to circuit B including windings 73 and 75 or to circuit A including windings 77 and 79 or to both circuits A and B.

In FIG. 4*a* of the drawings, a zero signal is represented by an "0" and a signal is represented by a "1." When there is no signal applied to either of the circuits A or B, there will be no output across winding 71 when a readout current $I_R$ is applied since $I_R$ alone will not produce a field sufficient to switch the core. This condition is shown as the first case of FIG. 4*a*.

In the second and third cases of FIG. 4*a* it can be seen that when a signal is present in either of circuits A or B, there will be an output voltage across winding 71. This is due to the fact that if a signal is present in either circuit A or B, there will be a field produced in either winding 73, 75, 77 or 79 which is in a direction to aid the field produced by $I_R$ and hence the switching of core 70 will occur, creating a voltage output across winding 71. If, as shown in the fourth case of FIG. 4*a*, there is a signal present in both circuits A and B, then there will be no output voltage across winding 71 when $I_R$ is applied thereto. This situation results from the fact that the field produced in windings 73 and 75 will cancel out or be cancelled out by the field produced in windings 77 and 79 and since the current $I_R$ is not strong enough to switch core 70, there will be no output voltage thereacross.

Referring now to FIGS. 5 and 5*a* of the drawings, an "Equivalence" gate is shown which, in addition to circuits A and B, is provided with a pulse bias circuit. Core 80 is provided with a readout winding 81, a signal input circuit A having windings 83 and 85, a signal input circuit B having windings 87 and 89 and a pulse bias circuit having windings 91 and 93. A pulse bias signal is applied each time the current pulse $I_R$ is applied to readout winding 81. If no signal is applied to either of the circuits A or B then the flux produced in either winding 91 or 93 from the pulse bias current will aid the flux produced in readout winding 81 and a voltage output will occur across winding 81 as indicated in the table of FIG. 4. When a signal is applied to either of circuits A or B but not to both, the flux produced by windings 91 and 93 of the pulse bias winding will be nullified by flux produced in windings 87 and 89 by input circuit A or windings 83 and 85 of input circuit B. If a signal input is applied to both circuits A and B, however, the flux produced in windings 83 and 87 of circuits A and B will be greater than the flux produced in winding 91 of the pulse bias circuit and the flux produced by windings 85 and 89 of circuits A and B will be greater than the flux produced by winding 93 of the pulse bias circuit. When the readout current $I_R$ is applied the net flux produced in the core by windings 83, 87 and 91 or by windings 85, 89 and 93 will aid the flux produced by current $I_R$ in winding 81 causing core 80 to switch, thereby producing an output voltage cross winding 81.

Referring now to FIG. 6 of the drawings illustrating a "Not And" gate and to FIG. 6*a* illustrating a table indicating the operating modes of the gate, a core 100 is shown having a readout winding 101, input circuit A having windings 103 and 105, input circuit B having windings 107 and 109, and a pulse bias circuit having windings 111, 113 and 115. Windings 107 and 111 are disposed on the same portion of core 100 as winding 103. In like manner core 113 is disposed on the same portion of core 100 as winding 105 and winding 115 is disposed on the same portion of the core as winding 109. Windings 103, 105, 107, and 109 each have the same inductance rating e.g. 1, 2 henries. Winding 111 has an inductance rating of 3.0 henries, and winding 113 and 115 have inductance ratings of 1.0 henry, for example. In operation, a signal pulse is applied to the pulse bias circuit each time a current pulse $I_R$ is applied to readout winding 101 and at the same time that signal pulses may or may not be applied to circuits A and B. If, for example as indicated in the table of FIG. 6*a*, no signal pulse is applied to either of the circuits A or B during the time a current readout pulse $I_A$ is applied to winding 101 the flux produced by current flow through winding 115 of the pulse bias circuit will aid the flux produced by current $I_R$ in winding 101 and an output voltage will appear across winding 101. If there is a signal pulse applied to either of the circuits A or B, but not to both, the flux produced by current flow through either of the windings 113 or 115 will aid the flux produced by the current pulse $I_R$ in winding 101 to switch core 100 and cause a voltage output across readout winding 101. If a signal pulse is applied to both circuits A and B, the aiding flux produced by currents in windings 103 and 107 will be cancelled by the greater flux in the opposite direction produced by current flow in winding 111, and the aiding flux produced in windings 113 and 115 will be cancelled out by the greater of the opposing fluxes produced by currents flowing in windings 105 and 109 respectively.

Referring now to FIG. 7 of the drawings in which an alternative from of an "And" gate is illustrated a core 120 is provided with a readout winding 121 divided into a first portion and a second portion with a space between the two portions. A pulsed current $I_R$ may be applied to readout winding 121. Circuit A is provided with windings 123 and 125 and circuit B is provided with windings 127 and 129. Winding 127 is disposed upon the same portion of core 120 as winding 123. Likewise winding 129 is disposed on core 120 in the same portion as 125 both of which are wound on the core in the space between the two portions of readout winding 121.

The operation of core 121 may be illustrated by reference to the table of FIG. 7*a* in which the modes of operation of the circuit of FIG. 7 are indicated. In operation a signal may or may not be applied to circuits A and B when a readout current $I_R$ is applied to winding 121. In the event that no signal is applied to circuits A or B, there will be no aiding flux produced to add to the flux produced by readout current $I_R$, and core 121 will not be switched, in which case no output voltage will appear across winding 121 as indicated in the first line of the table of FIG. 7*a*. If a signal is applied to either of the circuits A or B, but not to both, the aiding flux produced in either winding 125 or 129 will be in the portion of the core between the first and second portions of readout winding 121 where there is no flux produced by the current $I_R$ flow through winding 121. As a result the flux in core 120 will be insufficient to cause the core to be switched and no output voltage will appear across readout winding 121. On the other hand if a signal is present in both circuits A and B, the aiding flux produced by both windings A and B will be great enough to start switching action in the core between the two portions of readout winding 121. The core of the present invention is preferably composed of magnetic material known in the trade as permalloy in the form of a thin wire of about .0015" to .003" in diameter and having a length of approximately one to five inches. This wire core is given a twist of about one turn per inch in length and maintained in the twisted condition by a mechanical restraint applied thereto. The invention, however, is not limited to a core of this configuration and dimensions nor is it necessary to impart the exact degree of twist thereto as disclosed herein as cores having different sizes and degrees of twist may be employed without departing from the spirit and scope of the present invention.

Obviously many modifications and variations of the present invention are possible in the light of the above teachings. It is therefore to be understood, that within the scope of the appended claims, the invention may be practiced otherwise than as specifically described.

What is claimed is:

1. A multi-stage logic circuit comprising a first stage including a first saturable core linearly disposed, means applying a torsional strain to said first core, a first input circuit including input winding means on said first core, a first readout winding on said first core, a first reset winding on said first core, a second stage including a second saturable core linearly disposed, means applying a torsional strain to said second core, a second input circuit including input winding means on said second core, a second readout winding on said second core, a second reset winding on said second core, means connecting said input circuit to a source of signal output voltage from a previous stage of said logic circuit, means serially interconnecting said first readout winding and said second reset winding to a first source of readout current pulses whereby a current pulse from said first source may reset said second core, means connecting said first readout winding to said second input circuit whereby an output voltage from said first readout winding may supply an input voltage pulse to said second input circuit, said first reset winding and said second readout winding serially interconnected to a second source of readout current pulses whereby a current pulse from said first source may reset said first core, said current pulses from said first source and from said second source being alternately applied, the signal voltage applied to said first input circuit together with the readout current pulse applied to said first readout winding being sufficient to cause said first core to saturate whereby a readout voltage will appear across said first readout winding when an input signal is present in said first input circuit, the signal voltage applied to said second input together with the current pulse applied to said second readout winding being sufficient to saturate said second core whereby a readout voltage will appear across said second readout winding when an input signal is present in said second input circuit.

2. A magnetic gate circuit comprising a saturable core, means applying a torsional strain to said core, a pulse bias circuit, a first signal circuit, a second signal circuit, a readout circuit, said pulse bias circuit being connected to a source of bias voltage pulses, said first signal circuit being connected to a source of first signal voltage pulses, said second signal circuit being connected to a source of second signal voltage pulses, said readout circuit being connected to a source of readout circuit pulses, said pulse bias circuit having a first winding on said core and a second winding on said core, said first signal circuit having a first winding and a second winding on said core, said second signal circuit having a first winding and a second winding on said core, said first winding being wound on a first portion of said core, said second windings being wound on a second portion of said core, said readout circuit including a readout winding, said first winding of said pulse bias circuit being wound in the same sense as said readout winding, said first windings of said first and second signal circuits being wound in opposite sense to said readout winding, said second winding of said pulse bias circuit being wound in opposite sense to said readout winding, said second windings of said first and second signal circuits being wound in the same sense as said readout winding whereby an output voltage will appear across said readout winding when a net flux is produced at one of said first and second portions of said core in addition to and in the same direction as the flux produced by said readout winding.

3. A magnetic logic circuit having a saturable core, said core having a torsional strain applied thereto, a readout circuit having a readout winding on said core, said readout winding being connected to a source of current pulses, a first pulse bias circuit having winding means on said core, said pulse bias circuit connected to a source of bias voltage pulses, a first signal circuit having winding means on said core, said first signal circuit connected to a source of first signal voltage pulses, a second signal circuit having winding means on said core, said second signal circuit connected to a source of second signal voltage pulses, said logic circuit operative to produce an output voltage across said readout winding when a net flux is produced in addition to and in the same direction as the flux produced by a current pulse in said readout winding.

4. A magnetic logic circuit comprising a linearly disposed core, means applying a torsional strain to said core, a first signal circuit, a second signal circuit, a readout circuit, said first signal circuit being connected to a source of first signal voltage pulses, said second signal circuit being connected to a source of second signal voltage pulses, said readout circuit being connected to a source of readout current pulses, said first signal circuit having a first winding on a first portion of said core and a second winding on a second portion of said core, said second signal circuit having a third winding on the first portion of said core and a fourth winding on the second portion of said core, said readout circuit including a winding extending over the first and second portions of said core, said first and fourth windings being wound in the same sense as said readout winding and said second and third windings being wound in an opposite sense to said readout winding whereby an output voltage will appear across said readout winding when a net flux is produced at one of said first and second portions of said core in addition to and in the same direction as the flux produced by said readout winding.

5. A magnetic logic circuit comprising a linearly disposed saturable core, means applying a torsional strain to said core, a first signal circuit, a second signal circuit, a readout circuit, said first signal circuit being connected to a source of first signal voltage pulses, said signal circuit being connected to a source of second signal voltage pulses, said readout circuit being connected to a source of readout current pulses, said first signal circuit having a first winding on a first portion of said core and a second winding on a second portion of said core, said second signal circuit having a third winding on the first portion of said core and a fourth winding on the second portion of said core and a fourth winding on the second portion of on said core extending over the length of said core except in the second portion thereof, said first and third windings being wound in opposite sense to said readout winding and said second and fourth windings being wound in the same sense as said readout winding whereby an output voltage will appear across said readout winding when a flux is produced in the second portion of said core which is produced by the applications of a first and second signal voltage being applied simultaneously to said first and second signal circuits.

References Cited by the Examiner

UNITED STATES PATENTS

| | | | |
|---|---|---|---|
| 2,920,317 | 1/1960 | Mallery | 340—174 |
| 3,069,661 | 12/1962 | Gianola | 340—174 |

TERRELL W. FEARS, *Acting Primary Examiner.*

S. M. URYNOWICZ, *Assistant Examiner.*